United States Patent
Hutter, III

(10) Patent No.: US 8,038,823 B2
(45) Date of Patent: Oct. 18, 2011

(54) PEEL PLY MASKING DEVICE FOR AN ADHESIVE BONDED ATTACHMENT

(75) Inventor: Charles G. Hutter, III, Carson City, NV (US)

(73) Assignee: Physical Systems, Inc., Carson City, NV (US)

( * ) Notice: Subject to any disclaimer, the term of this patent is extended or adjusted under 35 U.S.C. 154(b) by 0 days.

(21) Appl. No.: 12/699,210

(22) Filed: Feb. 3, 2010

(65) Prior Publication Data
US 2010/0147453 A1    Jun. 17, 2010

Related U.S. Application Data

(63) Continuation of application No. 11/608,886, filed on Dec. 11, 2006, now abandoned.

(60) Provisional application No. 60/751,806, filed on Dec. 19, 2005.

(51) Int. Cl.
 *B32B 37/12* (2006.01)
 *B32B 38/10* (2006.01)
 *B29C 65/48* (2006.01)
 *C09J 5/02* (2006.01)

(52) U.S. Cl. ..... 156/247; 156/291; 156/295; 156/307.3; 156/307.7

(58) Field of Classification Search .................. 156/247, 156/290, 291, 295, 307.1, 307.3, 307.7
See application file for complete search history.

(56) References Cited

U.S. PATENT DOCUMENTS

| | | | |
|---|---|---|---|
| 4,134,153 A | 1/1979 | Voorhees | |
| 5,013,391 A | 5/1991 | Hutter, III et al. | |
| 5,888,335 A * | 3/1999 | Kobe et al. | 156/306.3 |
| 6,001,441 A | 12/1999 | Polizzano | |
| 6,773,780 B2 | 8/2004 | Hutter, III | |
| 7,084,516 B2 * | 8/2006 | Takei et al. | 257/783 |
| 2003/0035684 A1 * | 2/2003 | Hutter, III | 403/267 |

FOREIGN PATENT DOCUMENTS

JP         04198383  A  *  7/1992

OTHER PUBLICATIONS

English Abstract of JP 04-198383.*

* cited by examiner

*Primary Examiner* — Philip Tucker
*Assistant Examiner* — Sing Chan
(74) *Attorney, Agent, or Firm* — Lowry Blixseth LLP; Stuart O. Lowry; Scott M. Lowry

(57) ABSTRACT

A peel ply conformable masking device for protectively overlying a pre-cleaned bonding surface of an adhesive attachment adapted for bonded affixation to a selected substrate, such as an adhesive attachment of the type disclosed in U.S. Pat. Nos. 5,013,391 and 6,773,780 having a bonding surface circumscribing a temporary attachment member for holding the attachment against the substrate for the duration of a bonding agent cure time. The bonding surface of the adhesive attachment is pre-cleaned as by sand blasting and/or etching, and the masking device comprising a peel-off film carrying a thin layer of a peel-off adhesive is placed thereover to prevent contamination thereof. The masking device includes at least one aperture surrounding the temporary attachment member, and further includes at least one outwardly protruding and easily grasped pull tab for facilitated peel-off separation from bonding surface immediately prior to bonded affixation to the selected substrate.

6 Claims, 3 Drawing Sheets

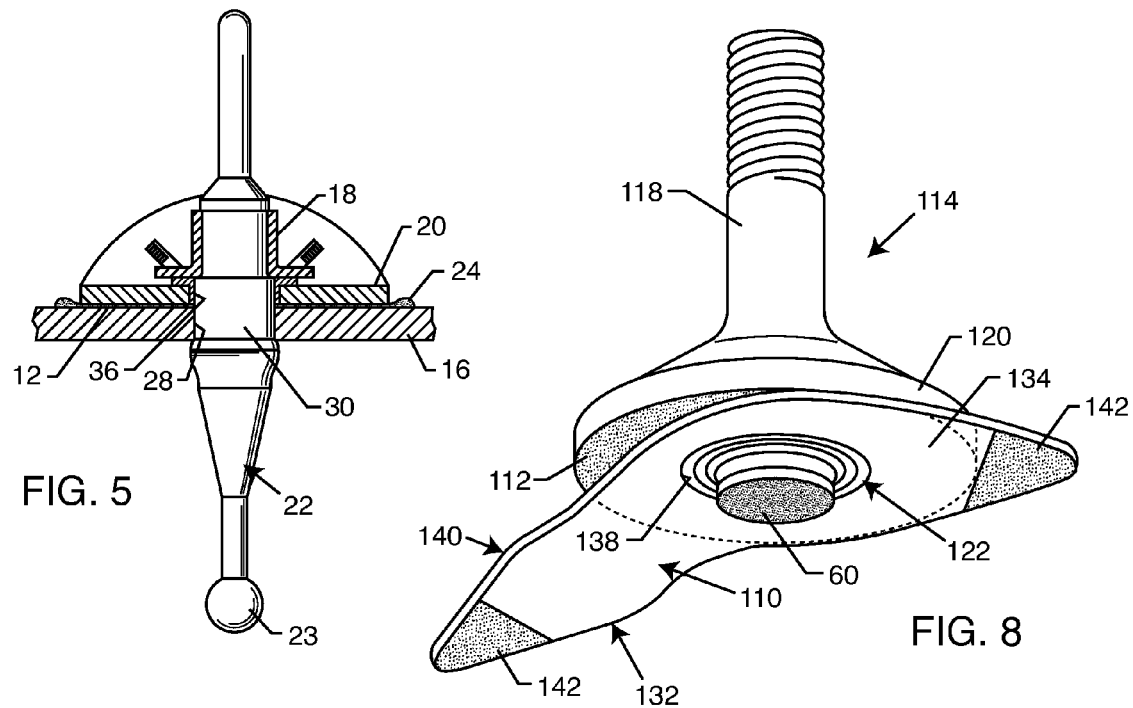
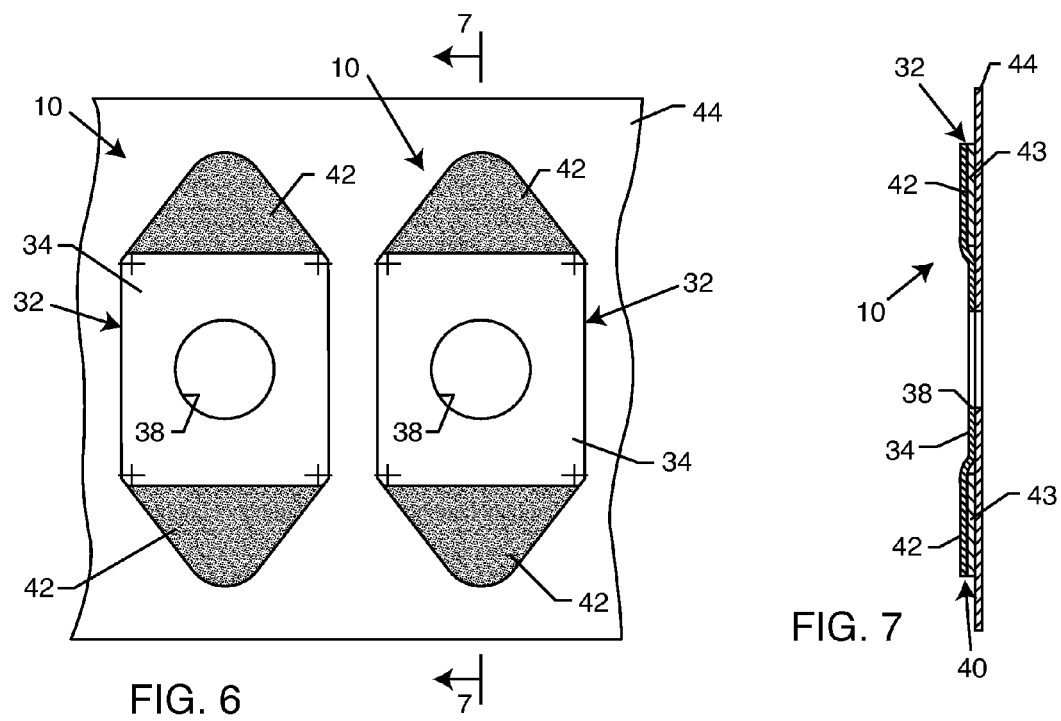

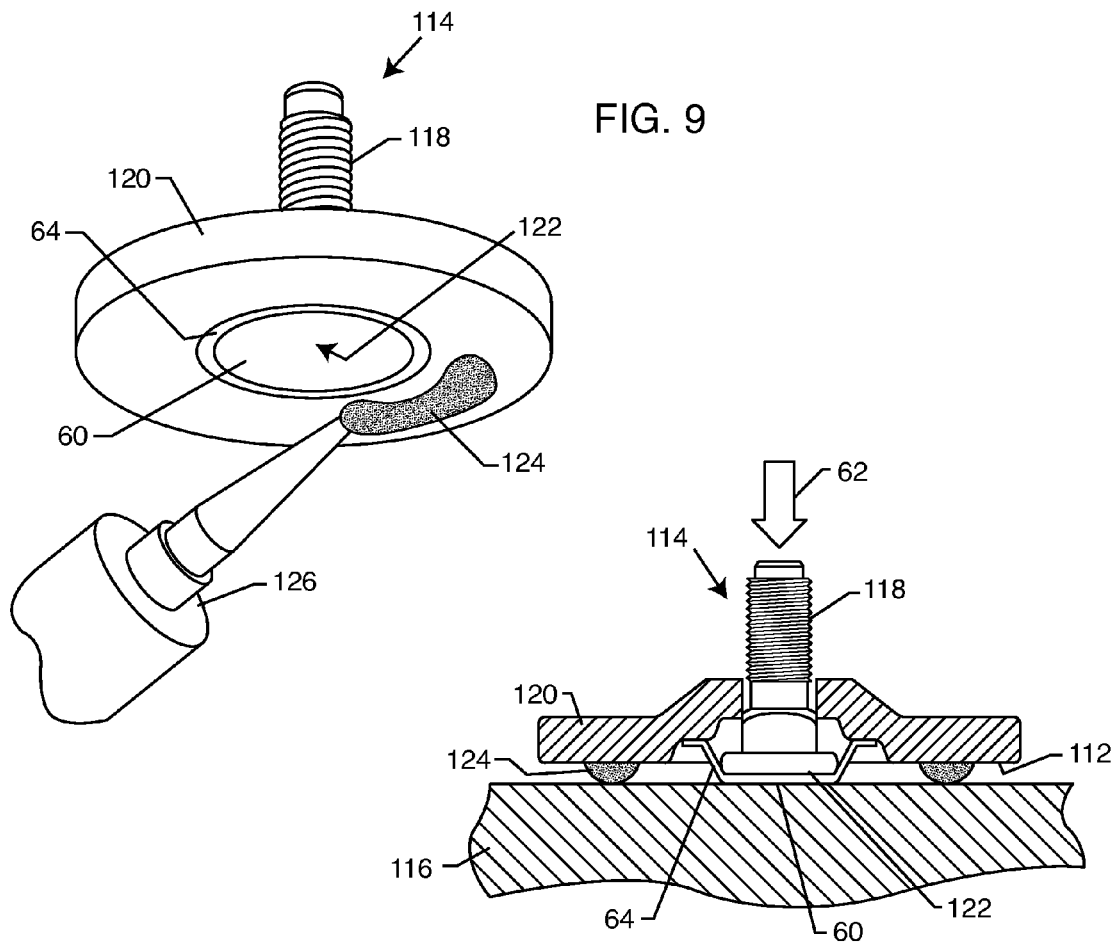
FIG. 9
FIG. 10
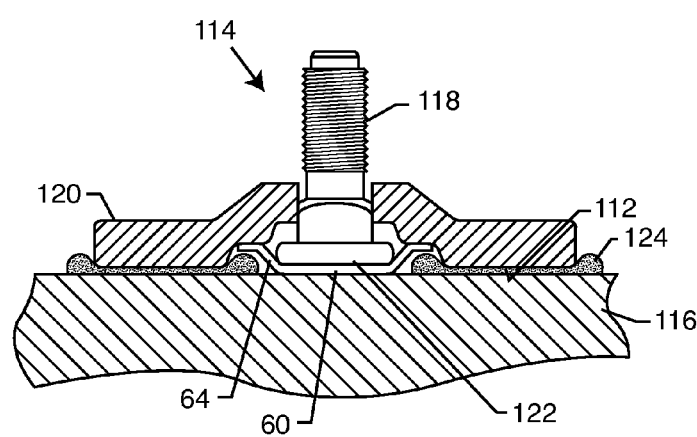
FIG. 11

PEEL PLY MASKING DEVICE FOR AN ADHESIVE BONDED ATTACHMENT

RELATED APPLICATION

This application is a continuation of U.S. application Ser. No. 11/608,886 filed on Dec. 11, 2006, which is now abandoned, which claim the benefit of U.S. Provisional Application No. 60/751,806 filed on Dec. 19, 2005.

BACKGROUND OF THE INVENTION

This invention relates generally to improvements in and to adhesive attachments of the type designed for bonded affixation to a selected substrate, such as an adhesive attachment of the type disclosed in U.S. Pat. Nos. 5,013,391 and 6,773,780 having a bonding surface circumscribing a temporary attachment member which holds the attachment bonding surface against the substrate for the duration of a bonding agent cure time. More specifically, this invention relates to a protective peel-off masking device for overlying a pre-cleaned attachment bonding surface to safeguard the bonding surface against undesired contamination prior to installation onto the selected substrate.

Adhesive bonded attachments are generally known in the art for connecting a selected component such as a threaded nutplate or a threaded bolt onto a selected substrate such as a panel or other frame component in an aerospace or automotive application or the like. Such adhesive attachments typically define a bonding surface adapted to receive a selected curable bonding agent, whereupon the bonding surface is pressed against the selected substrate for the duration of bonding agent cure time. In preferred attachment designs, a temporary attachment member is provided for temporary connection to or engagement with the substrate in a manner functioning to urge or draw the bonding surface firmly against the substrate until the bonding agent is substantially completely cured. As a result, the adhesive bonded attachment is affixed to the substrate with a substantially optimized adhesive attachment force. In one such adhesive attachment design, as disclosed in U.S. Pat. No. 5,013,391 which is incorporated by reference herein, a nutplate assembly includes a threaded nut carried by a nutplate base which defines the bonding surface for adhesive bonded attachment to the substrate. The threaded nut additionally carries a resilient fixture pin having a size and shape to be pulled into and bindingly engage an opening formed in the substrate. This fixture pin thus comprises the temporary attachment member circumscribed by the bonding surface on the nutplate base. The fixture pin functions to draw the bonding surface of the nutplate base firmly against the substrate for the duration of a bonding agent cure time, resulting in strong adhesive attachment of the nutplate base to the substrate. After the bonding agent cures, the resilient fixture pin can be pulled through the substrate opening and separated from the threaded nut. Subsequently, the threaded nut is exposed through the substrate opening for appropriate assembly with a suitable threaded fastener or the like.

In another adhesive attachment design, as disclosed in U.S. Pat. No. 6,773,780 which is also incorporated by reference herein, a threaded fastener such as a headed bolt or screw is carried by a generally annular mounting base defining the bonding surface for adhesive affixation to a selected substrate. In this design, the fastener head comprises the temporary attachment member circumscribed by the bonding surface on the mounting base. The fastener head carries a pressure sensitive adhesive or the like suitable for temporary or impermanent connection to the substrate. The thus-adhered fastener head cooperates with one or more resilient spring-like structures to apply a positive force to the mounting base in a direction pressing the bonding surface thereon against the substrate for the duration of a bonding agent cure time. Once again, this produces a strong adhesive bonded attachment of the mounting base to the substrate, which in turn supports and retains the fastener relative to the substrate.

While such adhesive bonded attachments of the above-described types beneficially secure the nutplate or fastener or other attachment component to the substrate with a strong adhesive bonding force, the actual or empirical bonding force can be adversely impacted by the condition and/or cleanliness of the bonding surface at the time of installation onto the substrate. In this regard, the bonding surface is normally pre-cleaned during product manufacture as by sand blasting and/or surface etching, to remove any particulate debris and further to passivate the bonding surface for optimum subsequent bond strength attachment with the selected bonding agent. However, despite such surface pre-cleaning, some bonding surface materials such as certain metals may exhibit varying degrees of oxidation contamination depending upon the time delay between product manufacture and subsequent installation of the adhesive attachment onto a substrate. Alternately, or in addition, post-production contamination of the bonding surface can be attributable to other factors, such as exposure of the bonding surface to dirt and dust, and/or the course of human handling prior to installation. Any or all of these factors can contribute to a reduced bond strength attachment force between the adhesive attachment and the substrate. To avoid this problem, it has sometimes been necessary to re-clean the bonding surface immediately prior to installation of the adhesive attachment onto the substrate.

There exists, therefore, a need for improvements in and to adhesive bonded attachments particularly with respect to an improved device or method for safeguarding a pre-cleaned attachment bonding surface against undesired post-production contamination in the course of pre-installation shipment, handling and/or storage. The present invention fulfills these needs and provides further related advantages.

SUMMARY OF THE INVENTION

In accordance with the invention, a relatively simple yet highly effective masking device is provided for mounting onto an adhesive bonded attachment, preferably in the course of attachment production, wherein the masking device effectively overlies and safeguards a pre-cleaned attachment bonding surface against undesired post-production contamination which could otherwise interfere with adhesive bonded affixation of the attachment onto a selected substrate. The masking device comprises a relatively thin and somewhat resilient film ply constructed from a substantially fluid-impervious material. The film ply overlies the attachment bonding surface in substantially hermetically sealed and intimate conformal relation therewith, as by means of a selected peel-off pressure sensitive adhesive or the like. Immediately prior to installation onto the selected substrate, the film ply and adhesive means are peeled away to expose the pre-cleaned attachment bonding surface to receive a selected curable bonding agent preparatory to installation onto the substrate.

In a preferred form, the adhesive attachment includes the pre-cleaned bonding surface in a configuration substantially circumscribing or surrounding a temporary attachment member, of the general type disclosed in U.S. Pat. Nos. 5,013,391 and 6,773,780. The masking device comprising the film ply and associated peel-off adhesive means is constructed in a shape for substantially matingly overlying the bonding surface, whereby the masking device also circumscribes the temporary attachment member, i.e., the masking device has at least one aperture formed therein to accommodate pass-through reception of the temporary attachment member. In addition, the film ply defines at least one pull tab which projects outwardly beyond a periphery of the bonding surface for facilitated peel-off separation of the masking device immediately prior to attachment installation onto the substrate. The pull tab, in the preferred form, also projects outwardly beyond the associated peel-off adhesive means for sealably securing the film ply over the bonding surface.

Preferred materials for the film ply comprise relatively thin polyimide or polyester film material having suitable substantially fluid-impervious or gas-impervious properties, and preferably having a thickness on the order of about 0.001 inch to provide sufficient hermetically sealed conformance with non-planar bonding surface configurations, and also to provide sufficient stretch capacity for facilitated peel-off separation in otherwise relatively close-fit relation with other attachment components such as the temporary attachment member. Preferred peel-off adhesive materials for use with the film ply include acrylic and silicone-based adhesives, preferably having a highly cross-linked and substantially cured construction to avoid deposit of any significant residual adhesive material on the associated attachment bonding surface following peel-off separation of the masking device. In the most preferred form, the peel-off adhesive material used with the film ply is compatible with the bonding agent applied subsequently to the exposed bonding surface, so that any residual adhesive material remaining on the bonding surface after masking device separation will not adversely impact attachment bond strength affixation to the substrate.

Other features and advantages of the present invention will become apparent from the following more detailed description, taken in connection with the accompanying drawing which illustrate, by way of example, the principles of the present invention.

BRIEF DESCRIPTION OF THE DRAWINGS

The accompanying drawings illustrate the invention. In such drawings:

FIG. 5 is an enlarged and fragmented sectional view taken generally on the line 5-5 of FIG. 4;

FIG. 6 is an enlarged and fragmented plan view showing a succession of peel ply masking devices of the present invention carried on a liner tape;

FIG. 7 is a cross sectional view taken generally on the line 7-7 of FIG. 6;

FIG. 8 is an underside perspective view showing an alternative adhesive bonded attachment in the form of a threaded stud carried by a mounting base defining an attachment bonding surface, and further illustrating a peel ply masking device in accordance with one alternative preferred form of the invention for normally covering and masking the attachment bonding surface;

FIG. 9 is an underside perspective view of the threaded stud and mounting base-type attachment shown in FIG. 8, and further depicting placement of an adhesive bonding agent onto the bonding surface of the mounting base, following peel-off removal of the masking device;

FIG. 10 is a fragmented vertical sectional view showing initial placement of the attachment of FIG. 9 onto a selected substrate; and FIG. 11 is a fragmented vertical sectional view similar to FIG. 10, but illustrating secure bonded affixation of the attachment to the substrate.

DETAILED DESCRIPTION OF THE PREFERRED EMBODIMENTS

Figure 1:
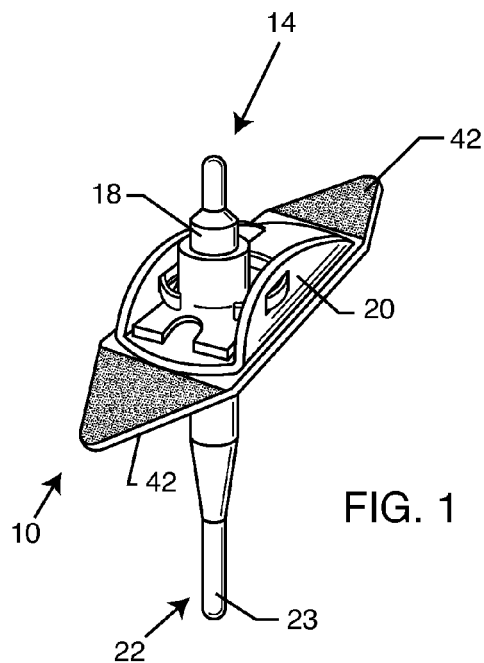
FIG. 1 is a perspective view of an exemplary adhesive bonded attachment in the form of a nutplate assembly for adhesive bonding onto a substrate, wherein a nutplate base carries a peel ply masking device embodying the novel features of the invention.
Figure 2:
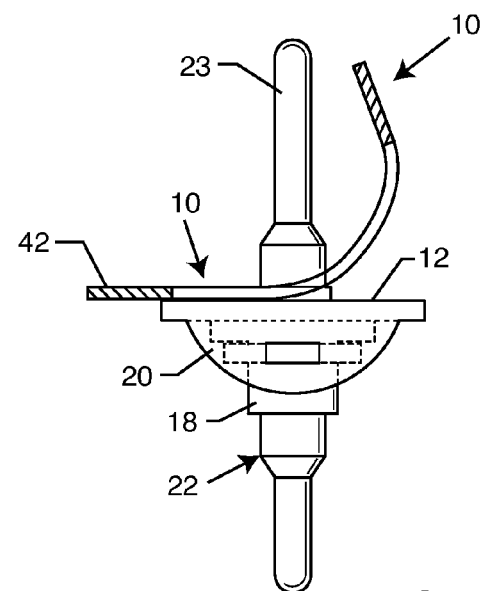
FIG. 2 is a side elevation view of the nutplate assembly of FIG. 1, and illustrating peel-off removal of the masking device to expose a bonding surface on the nutplate base.
Figure 3:
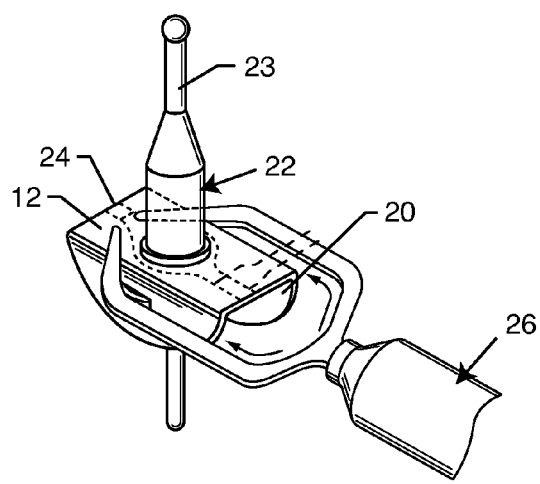
FIG. 3 is a fragmented perspective view showing placement of an adhesive bonding agent onto the exposed bonding surface of the nutplate base.

As shown in the exemplary drawings, a peel ply masking device referred to generally in FIGS. 1-2 and 6-7 by the reference numeral 10 is provided for protectively overlying a pre-cleaned bonding surface 12 (FIG. 5) of an adhesive attachment 14, such as the illustrative nutplate assembly shown in FIGS. 1-5. The adhesive attachment 14 is designed for relatively high strength adhesive bonded affixation onto a selected substrate 16. The peel ply masking device 10 of the present invention effectively safeguards the attachment bonding surface 12 against undesired post-production contamination which could otherwise adversely affect the bond-on affixation strength.

The illustrative adhesive attachment 14 shown in FIGS. 1-5 comprises a nutplate assembly of the type disclosed in U.S. Pat. No. 5,013,391, which is incorporated by reference herein. As shown, this nutplate assembly comprises a threaded nut 18 or the like carried preferably with at least some floating or freedom of movement by a nutplate base 20 having an underside surface defining the bonding surface 12. A resilient fixture pin 22 is carried by the threaded nut 18 to include a tail segment 23 protruding through the nutplate base 20 and projecting outwardly or downwardy therefrom. This fixture pin 22 comprises a temporary attachment member for short-term retention of the nutplate assembly 14 on the substrate 16 for the cure time of the selected bonding agent 24.

Figure 4:
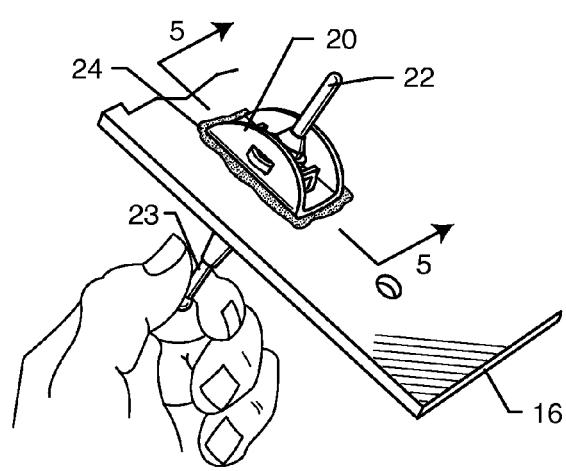
FIG. 4 is a fragmented perspective view depicting bond-on placement of the nutplate assembly of FIG. 3 onto a selected substrate.

In use, again as described in the above-referenced U.S. Pat. No. 5,013,391, a curable bonding agent 24 is applied directly onto the nutplate base bonding surface 12, as by means of a suitable agent applicator 26 as viewed in FIG. 3. The nutplate assembly 14 is then seated upon the selected substrate 16, such as a panel or frame component of an aircraft or automotive structure or the like, with the tail 23 of the fixture pin 22 extending through an opening 28 (FIG. 5) formed in the substrate 16. In this regard, the fixture pin 22 is sized for pull-through reception through the substrate opening 28, with a radially enlarged shoulder segment 30 on the fixture pin 22 bindingly engaging within the substrate opening 28. This binding engagement between the fixture pin and the substrate enables the fixture pin to apply a pulling or drawing force to the nutplate assembly 14, resulting in a positive force urging the bonding surface 12 toward the substrate 16. This arrangement effectively draws the bonding surface 12 toward intimate seated relation with the substrate, as the bonding agent 24 therebetween is extruded outwardly to achieve a minimum bond line thickness with a maximum bond strength attachment. The fixture pin 22 remains engaged with the substrate 16 for the duration of a bonding agent cure time, after which the fixture pin 22 can be separated from the adhesively bonded components by pulling outwardly on the tail segment 23 (FIG. 4).

The peel ply masking device 10 of the present invention effectively overlies and seals the bonding surface 12 of the nutplate assembly 14 to prevent undesired post-production contamination thereof. The masking device 10 is quickly and easily removable from the bonding surface 12 by simple peel-off separation therefrom, immediately prior to installation onto the substrate 16.

More particularly, as shown best in FIGS. 6-7, the peel ply masking device 10 comprises a film ply 32 formed from a selected material which is substantially impervious to fluids including but not limited to air. This film ply 32 may be constructed, in accordance with preferred forms, from a selected polymer-based material such as a polyimide or polyester film material having a relatively thin structure and sufficient inherent flexibility and/or resiliency to accommodate close-fit and substantially sealed overlying conformance with an associated bonding surface 12 which may exhibit deviations from a true planar shape. In this regard, a preferred thickness for the film ply 32 is on the order of about 0.001 inch.

The film ply 32 is pre-cut to define a main body segment 34 having a size and shape for substantially mated overlying fit with the associated bonding surface 12. In this regard, as viewed best in FIG. 6, the body segment 34 of each film ply 32 is shown with a generally rectangular geometry having suitable length and width dimensions for conformably overlying the generally rectangular shape of the bonding surface 12 on the underside of the associated nutplate base 20 (FIGS. 1-5). In addition, since the bonding surface 12 circumscribes or surrounds a central port 36 (FIG. 5) formed in the nutplate base 20 to accommodate passage of the fixture pin 22, the body segment 34 of the film ply 32 additionally includes at least one aperture 38 for alignment therewith.

A peel-off adhesive material 40 is provided in a thin layer underlying the peel ply 32, wherein this peel-off adhesive material 40 is designed for quickly and easily mounting the masking device 10 onto the bonding surface 12 in a conformably fit, substantially hermetically sealed manner. The peel-off adhesive material 40 comprises, in one preferred form, a pressure sensitive adhesive preferably such as an acrylic or silicone-based adhesive material that is highly cross-linked and substantially cured to avoid deposit of any significant residual adhesive material on the associated bonding surface 12 following peel-off separation from the bonding surface 12 substantially as a unit with the film ply. In the most preferred form, the peel-off adhesive material 40 used with the film ply 32 is compatible with the bonding agent 24 applied subsequently to the exposed bonding surface, so that any residual adhesive material remaining on the bonding surface after masking device separation will not adversely impact attachment bond strength affixation to the substrate.

The film ply 32 is additional formed to include at least one pull tab 42 protruding outwardly from the main body segment 34, with the illustrative drawings shown a pair of such pull tabs 42 projecting outwardly from opposite sides of the main body segment 34. These pull tabs 42 are, in the preferred form, associated with an underlying paper liner 43 (FIG. 7) to prevent adherence to the attachment 14 or other structure.

The masking device 10, as described, may be produced in tape form as by producing a succession of masking devices 10 adhered by means of the peel-off adhesive material 40 to one side of an elongated flexible tape carrier strip 44 as viewed in FIG. 6. In this form, the masking devices 10 may be subjected to a suitable punch-cut step for producing the central apertures 38 respectively therein (and also through the carrier strip 44). In addition, in this form, the masking devices 10 can be peel-away separated from the tape carrier strip 44 manually or by means of automated production equipment for individual mounting onto a nutplate base bonding surface 12 as viewed in FIGS. 1-2.

In such mounted position, each masking device 10 effectively overlies and seals the bonding surface 12, which has been pre-cleaned and passivated as by appropriate sand blasting and/or surface etching steps. The central aperture 38 in each masking device 10 is aligned with the port 36 in the bonding surface 12 to accommodate close-fit passage of the fixture pin 22 in a non-interfering manner. The paper-lined pull tabs 42 project outwardly from opposite ends of the bonding surface 12 for easy manual grasping and peel-off removal of the masking device 10 (FIG. 2), including the film ply 32 and associated peel-off adhesive material 40, with the film ply 32 having sufficient flexibility or resilience to pull away from the fixture pin 22 despite close-fit tolerance therewith. As a result, the pre-cleaned and mask-protected bonding surface 12 is now exposed for application of the bonding agent 24 (FIG. 3) and mounting onto the substrate 16 (FIGS. 4-5) as previously described.

FIGS. 8-11 depict the masking device of the present invention in one alternative preferred form, wherein components corresponding in structure or function with those previously shown and described herein are identified by common reference numerals increase by 100. As shown, the modified masking device 110 is configured for use with an alternative adhesive attachment 114, such as a threaded fastener 118 carried by a mounting base 120 defining a bonding surface 112 for adhesive bonded affixation onto a selected substrate 116. Such alternative adhesive attachment 114 is shown and described in further detail in U.S. Pat. No. 6,773,780, which is also incorporated by reference herein.

More particularly, the adhesive attachment 114 comprises the threaded fastener 118 such as a bolt or screw having an enlarged head 122 forming the temporary attachment member for short-term securement to the substrate 116. As shown, the fastener head 122 carries a pressure sensitive adhesive 60 of the like, in a position disposed generally centrally within and substantially surrounded or circumscribed by the bonding surface 112 of generally annular shape formed on the underside of the mounting base 120. In use, a selected bonding agent 124 is applied as by means of an applicator 126 (FIG. 9) to the bonding surface 112, followed by pressed seating of the mounting base 120 firmly against the substrate 116. The fastener 118 is then pressed firmly against the substrate 116, as indicated by arrow 62 in FIG. 10, to advance the adhesive-coated head 122 of the fastener into temporary adhesive connection with the substrate 116. The fastener head 118 thus applies a pulling or drawing force to a spring member 64 coupled between the fastener head and the mounting base 120, for purposes of drawing the mounting base 120 and the bonding surface 112 thereon firmly toward the substrate 116 for the duration of a bonding agent cure time. Once again, as in the prior-discussed embodiment, this drawing force beneficially causes the bonding agent 124 to be extruded outwardly to achieve a minimum bond line thickness with a maximum bond strength attachment.

The modified masking device 110 is constructed in generally the same manner as previously shown and described herein, to include a film ply 132 shaped for conformal overlying placement to protectively cover the bonding surface 112. In this regard, the film ply 132 includes a central body segment 134 having a peel-off adhesive material 140 lining one side thereof for sealed overlying placement covering the bonding surface 112, with at least one aperture 138 formed therein for accommodating the fastener head 122 and associated adhesive material 60 and spring member 64 in a non-interfering manner. The film ply 132 further includes at least one outwardly protruding pull tab 142, such as the pair of oppositely projecting pull tabs 142 shown in FIG. 8, wherein these pull tabs 142 are not associated with or lined by the peel-off adhesive material 140.

The modified masking device 110 thus also seals and protects the bonding surface 112 against post-production contamination. The masking device 110 is quickly and easily separated from the bonding surface 112 immediately prior to installation of the attachment 114 onto the substrate 116.

Although various embodiments and alternatives have been described in detail for purposes of illustration, various further modifications may be made without departing from the scope and spirit of the invention. Accordingly, no limitation on the invention is intended by way of the foregoing description and accompanying drawings, except as set forth in the appended claims.

What is claimed is:

1. In an adhesive attachment having a bonding surface substantially circumscribing a temporary attachment device for receiving a curable bonding agent used for adhesive fixation of said attachment to a substrate, a method of mounting the adhesive attachment, comprising the steps of:

initially overlying the attachment bonding surface with a peel ply masking device comprising a conformable film ply having a body segment formed from a substantially fluid impervious material, and a peel-off adhesive material carried by said film ply body segment for removably mounting said body segment onto the attachment bonding surface in intimate, substantially overlying fit relation therewith to prevent contamination thereof, said peel ply masking device having a central aperture formed therein in surrounding relation to the temporary attachment device;

peeling off the film ply and the peel-off adhesive material as a unit from the attachment bonding surface to expose the attachment bonding surface;

applying the curable bonding agent onto the attachment bonding surface; and adhering the adhesive attachment to the substrate by means of the temporary attachment device for the duration of a cure time for the curable bonding agent applied to the bonding surface, whereby the adhesive attachment is affixed to the substrate by the bonding agent.

2. The method of claim 1 wherein said film ply further includes at least one pull tab projecting outwardly from said body segment.

3. The method of claim 2 wherein said at least one pull tab projects outwardly beyond said peel-off adhesive material.

4. The method of claim 1 further including a step of forming said film ply from a material selected from the group consisting essentially of polyimide and polyester film material.

5. The method of claim 4 wherein said forming step comprises forming said film ply to have a thickness of about 0.001 inch.

6. The method of claim 1 further including a step of forming said peel-off adhesive material from the group consisting essentially of acrylic and silicone adhesives.

* * * * *